(12) United States Patent
Casas et al.

(10) Patent No.: US 8,911,247 B2
(45) Date of Patent: Dec. 16, 2014

(54) QUICK CONNECTOR SYSTEM LUMINIARY FITTING

(71) Applicant: A.L.P. Lighting & Ceiling Products, Inc., Niles, IL (US)

(72) Inventors: Sal Casas, Kennewaw, GA (US); Jesse Luc, Lithia Springs, GA (US); Joseph A. Monaco, Sr., Oxford, GA (US); Ronald L. Richardson, Conyers, GA (US)

(73) Assignee: A.L.P. Lighting & Ceiling Products, Inc., Niles, IL (US)

( * ) Notice: Subject to any disclaimer, the term of this patent is extended or adjusted under 35 U.S.C. 154(b) by 19 days.

(21) Appl. No.: 13/838,463

(22) Filed: Mar. 15, 2013

(65) Prior Publication Data

US 2014/0273572 A1    Sep. 18, 2014

(51) Int. Cl.
*H01R 4/60* (2006.01)
*F21V 19/00* (2006.01)

(52) U.S. Cl.
CPC .................................. *F21V 19/008* (2013.01)
USPC ........................................................ 439/206

(58) Field of Classification Search
USPC .............. 439/206, 280, 537, 205, 198, 699.2
See application file for complete search history.

(56) References Cited

U.S. PATENT DOCUMENTS

| 1,655,404 | A | | 2/1921 | Bassett |
| 2,321,510 | A | | 11/1941 | Paquette |
| 2,364,194 | A | | 1/1943 | Cortner |
| 2,723,060 | A | * | 11/1955 | Rieke ............................ 222/566 |
| 7,618,275 | B2 | | 11/2009 | Owen, Sr. et al. |
| 8,366,466 | B2 | * | 2/2013 | Hashimoto et al. ........... 439/206 |

* cited by examiner

*Primary Examiner* — Jean F Duverne
(74) *Attorney, Agent, or Firm* — Joan Pennington

(57) ABSTRACT

An luminary fitting is provided for implementing quickly and easily connecting to an associated device, such as a lighting fixture, gasketed enclosure or wiring box. The luminary fitting includes an enclosure body having a mating face for connection with a selected wiring installation configuration and an opposed face connecting with the associated device. The opposed face includes a threaded wire way extending into the associated device. A sealing gasket is provided with the threaded wire way. A pressure equalization vent is provided with the enclosure body for preventing pressure buildup, venting of any moisture that condenses from ambient air inside the luminary, gasketed enclosure, or wiring box, and for protecting against liquid ingress in the associated device.

18 Claims, 7 Drawing Sheets

QUICK CONNECTOR SYSTEM LUMINIARY FITTING

FIELD OF THE INVENTION

The present invention relates generally to fittings, and more particularly, relates to an interfacing luminary fitting for implementing quickly and easily connecting to an associated device, such as a lighting fixture, gasketed enclosure or junction box, arranged for reduced installation labor by allowing a luminary (lighting fixture) to be installed without disassembly in the field, minimizing wiring connection errors, preventing pressure buildup, while protecting against liquid ingress.

DESCRIPTION OF THE RELATED ART

Lighting fixtures, gasketed enclosures and wiring boxes are installed for many different applications that have requirements, for example, defined by the National Electrical Code, various safety codes, Underwriters Laboratories (UL) standards, local codes, and commonly accepted practices.

In the market today there are several gasketed enclosures which use an internal lighting fixture, such as, enclosed and gasketed fluorescent high bay units and LED lighting fixtures that are sealed for dust and wet location applications. The internal temperatures inside the enclosure can exceed 160° F. or about 71° C. As a conventional sealed lighting fixture is cycled, or turned off and on, during normal fixture operation, pressure inside the fixture varies. The varying pressure can negatively affect the sealing systems used to keep water, moisture and dust out of the fixture, especially when the fixture or any of its components are improperly installed.

Installation of lighting fixtures often requires licensed electrical contractors to install most lighting fixtures and typically is time consuming. In many cases labor expenses for fixture installation add significantly to the total fixture cost.

A need exists to provide an enhanced luminary fitting for implementing quickly and easily connecting to an associated lighting fixture, gasketed enclosure or wiring box, and minimizing wiring connection errors. It is desirable that such luminary fitting provides ease of wiring, maintains the ingress protection (IP) rating of the luminary, and prevents pressure buildup in the associated lighting fixture, gasketed enclosure or junction box.

SUMMARY OF THE INVENTION

A principal aspect of the present invention is to provide an enhanced luminary fitting for implementing quickly and easily connecting to a lighting fixture, gasketed enclosure or wiring box substantially without negative effect and that overcome many of the disadvantages of prior art arrangements.

In brief, a luminary fitting provides for implementing quickly and easily connecting to an associated device, such as a lighting fixture, gasketed enclosure or wiring box. The luminary fitting includes an enclosure body having a mating face for connection with a selected wiring installation configuration and an opposed face connecting with the associated device. The opposed face includes a threaded wire way extending into the associated device. A sealing gasket is provided with the threaded wire way. A pressure equalization vent is provided with the enclosure body for preventing pressure buildup and for protecting against liquid ingress in the associated device.

In accordance with features of the invention, a selected cover plate is connected to the mating face for use with a particular one of conduit or cord type power feed systems.

In accordance with features of the invention, the sealing gasket is a two-sided gasket that seals on both the inside and outside of the luminary, gasketed enclosure or wiring box with an internal threaded nut mounted on the threaded wire way.

In accordance with features of the invention, the enclosure body optionally is injected molded, machined, or formed.

In accordance with features of the invention, the enclosure body is formed of a selected material, such as, cast aluminum, galvanized steel, sheet molding compound (SMC) or other injection moldable plastic or composite material.

In accordance with features of the invention, the enclosure body is a unitary member.

In accordance with features of the invention, the luminary fitting is configured to reduce installation time, enabling the use of modular wiring systems both inside and outside the associated device.

In accordance with features of the invention, the luminary fitting includes the pressure equalization vent and or a weep hole for providing pressure venting capabilities and reducing the buildup of moisture inside luminary, gasketed enclosure or wiring box enabling effective use with a particular associated device.

In accordance with features of the invention, the pressure equalization vent includes a membrane formed of a selected material, such as, a selected polymer, a Gore-Tex fabric, or a polytetrafluoroethylene (PTFE) membrane.

In accordance with features of the invention, the luminary fitting enables selected ingress protection (IP) rating performance.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, an enhanced luminary fitting is provided for implementing quickly and easily connecting to an associated device, such as a lighting fixture, gasketed enclosure or junction box. The enhanced luminary fitting utilizes various design geometry and cover plates for use with a selected wiring installation configuration option. The enhanced luminary fitting is configured to allow assembly at a fixture factory location to be installed, for example, without opening the fixture for wiring. The enhanced luminary fitting is configured to be compatible with modular wiring plugs that advantageously are wired at the factor, enabling plug and play installation in the field. This saves labor time and reduces the labor cost of a fixture installation, while minimizing risk of wiring misconnections.

Figure 1:
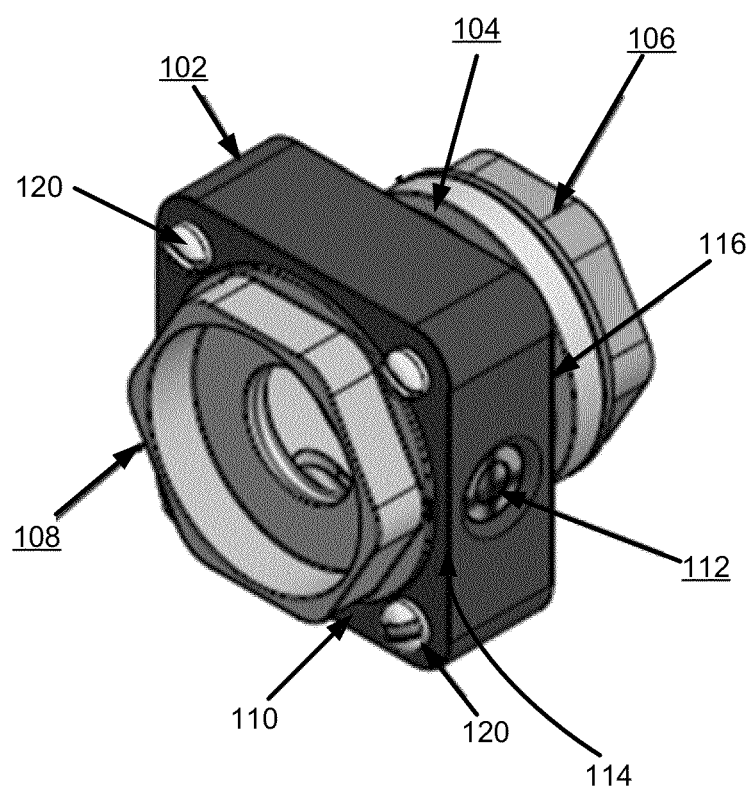
FIG. 1 is a perspective view not to scale illustrating an luminary fitting in accordance with a preferred embodiment.

Having reference now to the drawings, in FIG. 1, there is shown an enhanced luminary fitting generally designated by the reference character 100 in accordance with a preferred embodiment. The enhanced luminary fitting 100 is a flexible quick connector system (FQC) configured to reduce installation time, preventing wiring connection errors, enabling the use of modular wiring systems both inside and outside an associated device in an assembly, such as illustrated and described with respect to FIGS. 5A, 5B, 5C and 5D.

FQC luminary fitting 100 includes an enclosure body generally designated by the reference character 102, a sealing gasket generally designated by the reference character 104, and an internal threaded nut generally designated by the reference character 106. FQC luminary fitting 100 has an overall selected size based upon commonly used conduit and cord type power feed systems used in the lighting and electrical connector industry with a particular lighting fixture, gasketed enclosure or wiring box.

Figure 5A:
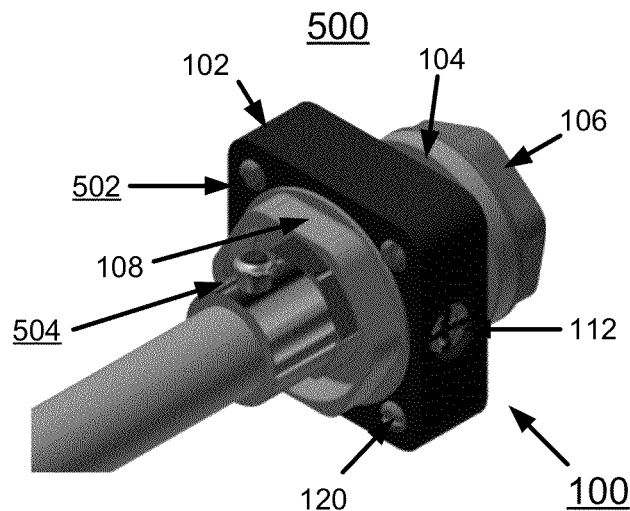
FIGS. 5A, 5B, 5C and 5D are perspective views not to scale illustrating example cover plates used with the mating face of the luminary fitting of FIG. 1 configured for use with a selected wiring installation configuration in accordance with a preferred embodiment.

As shown in FIG. 1, FQC luminary fitting 100 includes a circular threaded plug designated by the reference character 108 provided with an example cover plate 110 mounted to the enclosure body 102. The circular threaded plug 108 can interface, for example, with either conduit or wire grommet type fittings such as shown in FIGS. 5A and 5D.

FQC luminary fitting 100 includes a pressure equalization membrane vent 112 provided with the enclosure body 102 for preventing pressure buildup and venting moisture as well as for protecting against liquid ingress in the associated lighting fixture, gasketed enclosure, junction box or wiring box.

The pressure equalization membrane vent 112 alleviates the pressure variations present in conventional gasketed enclosed fixture during normal operating conditions. The pressure equalization membrane vent 112 enables the fixture to vent excess pressure and any moisture that may have accumulated inside the sealed fixture from ambient air.

The pressure equalization membrane vent 112 includes the membrane vent formed of a selected polymer, such as a Gore-Tex fabric or a polytetrafluoroethylene (PTFE) material, manufactured and sold by W.L. Gore & Associates, Inc. of Newark, Del., USA.

Figure 2A:
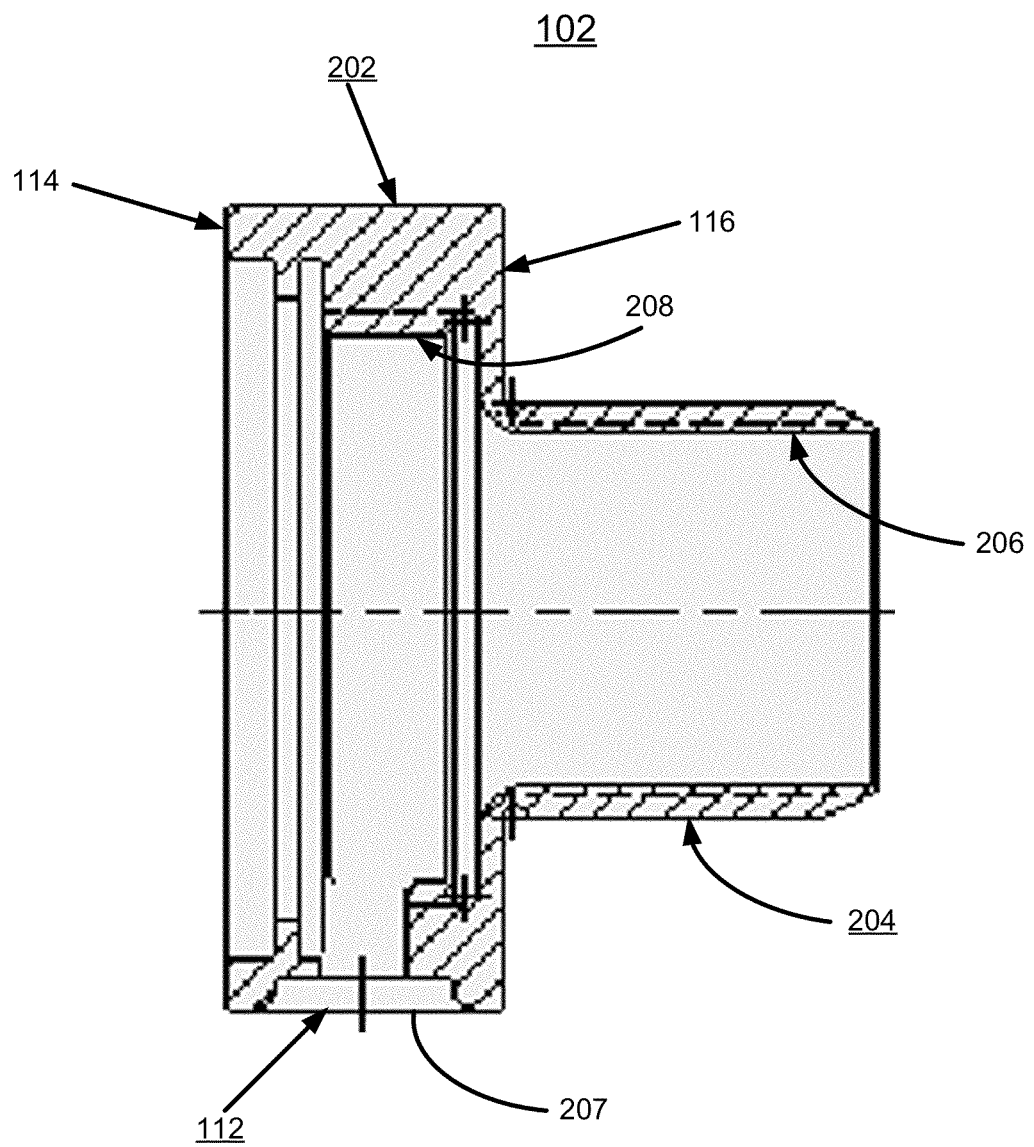
FIGS. 2A and 2B is a respective side sectional view and a perspective view not to scale illustrating an example enclosure body of the luminary fitting of FIG. 1 in accordance with a preferred embodiment.
Figure 2B:
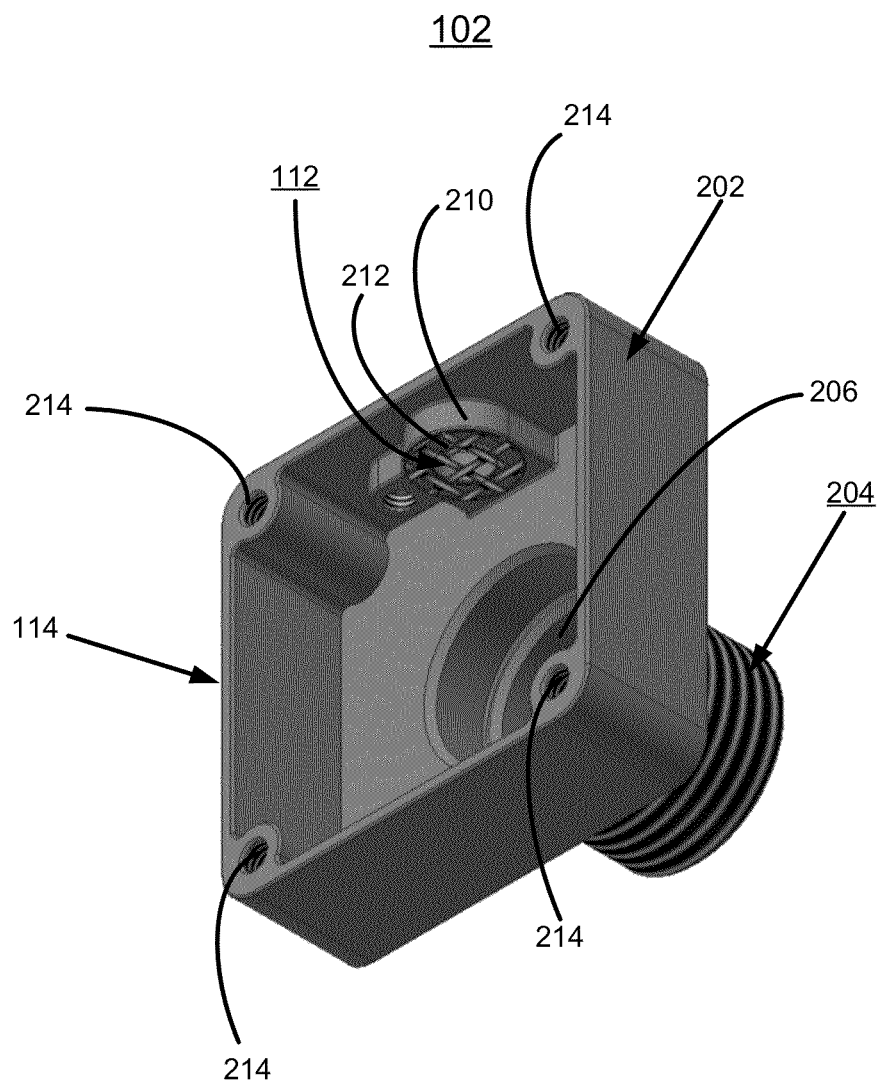

The enclosure body 102 has a mating face 114 for connection with the cover plate 110 or another selected cover plate for connection with a particular selected wiring installation configuration and an opposed face 116 connecting with the associated device including a threaded wire way 204, for example, as shown in FIGS. 2A and 2B. A plurality of fasteners 120 are received through the cover plate 110 into the enclosure body 102. The plurality of example fasteners 120 also are shown in FIG. 3B.

Referring also to FIGS. 2A and 2B, there is shown an example enclosure body generally designated by the reference character 102 of the luminary fitting 100 in accordance with a preferred embodiment. The threaded wire way 204 extending into the associated device defines a wire passageway 206 that has a selected size or diameter to accommodate a number of loose conductors as well as modular plug systems but is not limited to one size only.

The pressure equalization membrane vent 112 is received within an aperture 207 defined within a housing recess 208 in the enclosure body 102, such as shown in FIG. 2A with a housing feature 210 and a housing mesh 212 in the enclosure body 102, such as shown in FIG. 2B. It should be understood that pressure equalization membrane vent 112 of the invention is not limited to the illustrated features; various other housing configurations can be used.

The enclosure body 102 includes a plurality of mating apertures 214, such as threaded openings 214 receiving the fasteners 120 and securing the cover plate 110.

Figure 3A:
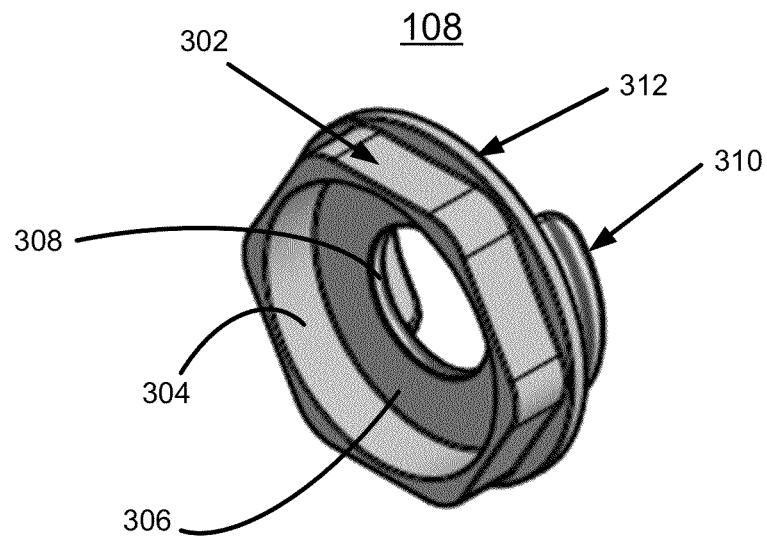
FIGS. 3A and 3B are perspective views not to scale respective illustrating an example circular threaded plug and an example flat interface plate used with a mating face of the luminary fitting of FIG. 1 for connection with a selected wiring installation configuration in accordance with another preferred embodiment.
Figure 3B:
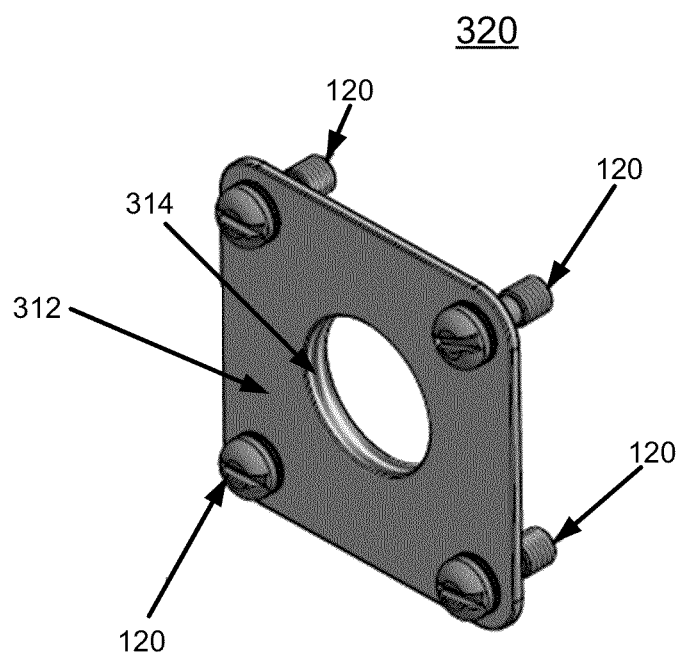

Referring to FIGS. 3A and 3B, there are respectively shown an example circular threaded plug 108 and an example flat interface plate generally designated by the reference character 320 used with the enclosure body mating face 114 of the luminary fitting 100 for connection with a selected wiring installation configuration in accordance with another preferred embodiment.

In FIG. 3A, the circular threaded plug 108 includes an outwardly extending flange 302 defining an enlarged opening 304 to an interior wall member 306. A reduced opening 308 is generally centrally located within the interior wall member 306 with a threaded outwardly member 310 extending rearwardly from the interior wall member 306 and having a selected clearance configuration for mating engagement with the enclosure body 102. A stop wall 310 of the circular threaded plug 108 is defined by an inward portion of the outwardly extending flange 302 to engage with a selected wiring installation configuration in an assembly, such as illustrated and described with respect to FIGS. 5A, and 5D.

In FIG. 3B, the flat interface plate 320 includes a generally square cover plate 322 with a generally centrally located opening 324, as shown, for use with applications like flexible liquid tight conduit, steel conduit and flexible conduit. The generally square cover plate 322 receives the plurality of fasteners 120 that are received in the plurality of mating apertures 214 of the enclosure body 102 shown in FIG. 2B.

Figure 4A:
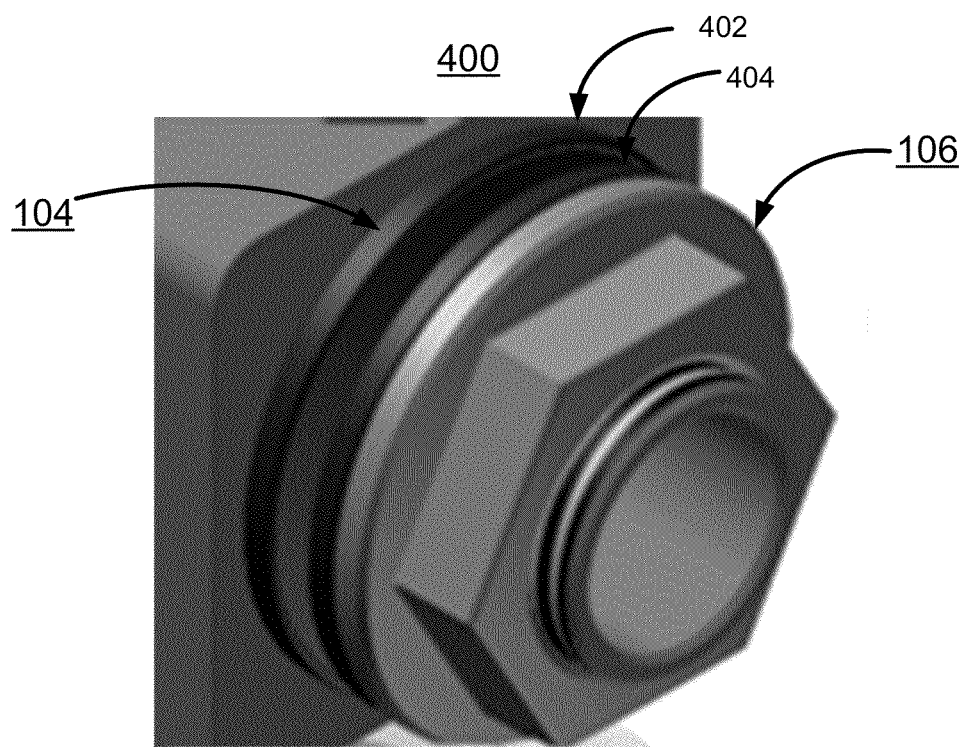
FIGS. 4A and 4B are fragmentary perspective views not to scale illustrating an example sealing configuration used with an opposed face of the luminary fitting of FIG. 1 connected with the associated device in accordance with a preferred embodiment.
Figure 4B:
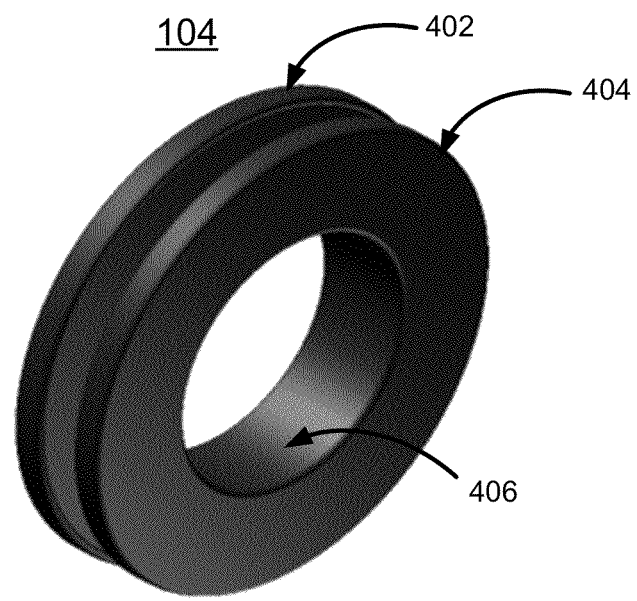

Referring to FIGS. 4A and 4B, an example sealing configuration generally designated by the reference character 400 used with an opposed face 116 of the luminary fitting 100 connected with the associated device in accordance with a preferred embodiment. The sealing gasket 104 is engaged by the internal threaded nut 106 mounted to the threaded wire way 204.

In FIG. 4B, the example sealing gasket 104 of the luminary fitting 100 is shown separately in accordance with a preferred embodiment. The sealing gasket 104 is a two-sided gasket including a pair of opposed sides 402, 404 with a central opening 406 mounted on the threaded wire way 204 that extends into the associated device, lighting fixture, gasketed enclosure or wiring box. The sealing gasket 104 seals on both the inside and outside of the associated lighting fixture, gasketed enclosure or wiring box with the internal threaded nut 106 mounted on the threaded wire way 204.

The sealing gasket 104 also provides vibration isolation for the luminary fitting 100 where vibration typically would be transmitted through the power feed conduit. The sealing gasket 104 is formed of a selected material, such as an elastomeric material, a rubber, a type of synthetic rubber, such as, EPDM rubber (ethylene propylene diene monomer rubber), neoprene, or silicon.

Referring to FIGS. 5A, 5B, 5C and 5D, there are shown example assemblies with cover plates used with the mating face of the luminary fitting 100 configured for use with a selected wiring installation configuration in accordance with a preferred embodiment.

In FIG. 5A, there is shown an example assembly generally designated by the reference character 500. Assembly 500 includes a cover plate 502 used with the mating face of the luminary fitting 100 configured for use with a selected electrical metallic tubing (EMT) wiring installation 504 screwed on the cover plate 502.

Figure 5B:
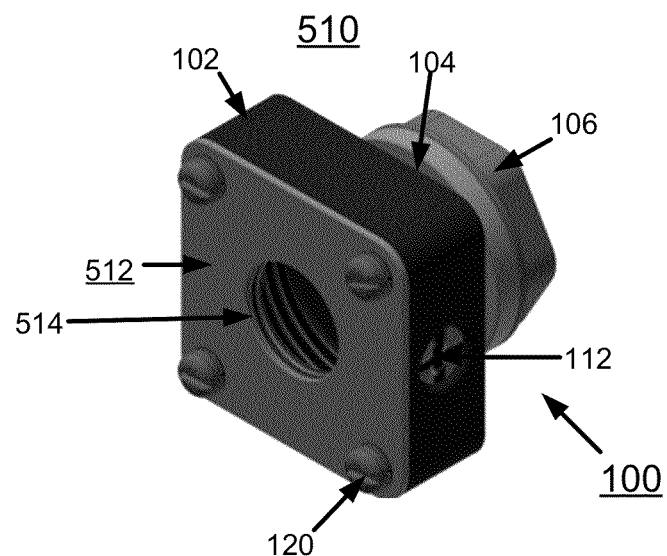

In FIG. 5B, there is shown an example assembly generally designated by the reference character 510. Assembly 510 includes a cover plate 512 used with the mating face of the luminary fitting 100 configured for use with a selected rigid galvanized conduit (RGC) wiring installation mounted on the flat cover plate 512 with opening 514.

Figure 5C:
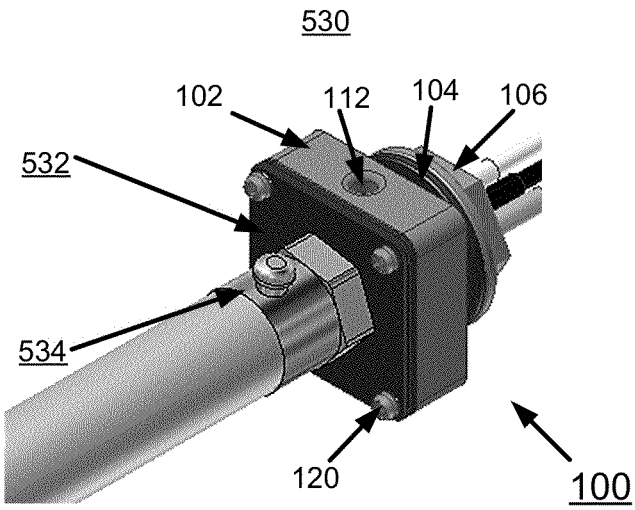
Figure 5D:
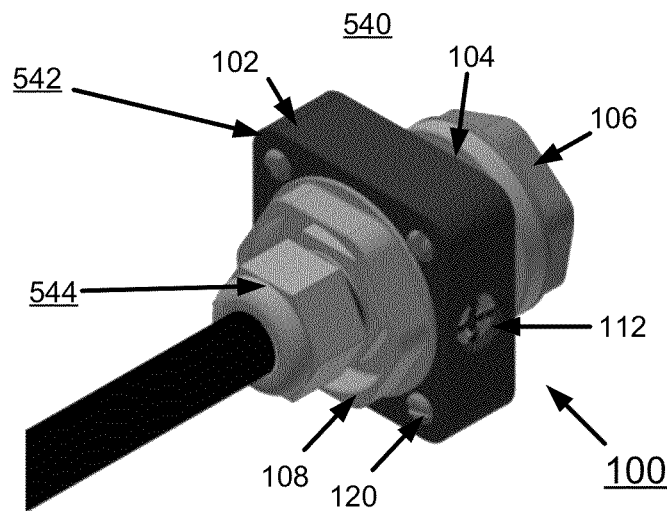

In FIG. 5C, there is shown an example assembly generally designated by the reference character 530. Assembly 530 includes a square cover plate 532 used with the mating face of the luminary fitting 100 configured for use with a selected electrical metallic tubing (EMT) wiring installation 534 mounted on the square cover plate 532.

In FIG. 5D, there is shown an example assembly generally designated by the reference character 540. Assembly 540 includes a cover plate 542 used with the mating face of the luminary fitting 100 configured for use with a selected cord/compression wiring installation connector 544 screwed on the cover plate 542.

While the present invention has been described with reference to the details of the embodiments of the invention shown in the drawing, these details are not intended to limit the scope of the invention as claimed in the appended claims.

What is claimed is:

1. A luminary fitting for implementing enhanced connection with an associated device, said luminary fitting comprising:
an enclosure body having a mating face for connecting with a selected wiring installation configuration;
said enclosure body having an opposed face for connecting with the associated device;
said opposed face including a threaded wire way extending into the associated device;
a sealing gasket being provided with said threaded wire way, said sealing gasket including a two-sided gasket with a pair of opposed sides, and a central opening mounted on said threaded wire way, and said opposed sides of said two-sided gasket respectively sealing an inside and an outside of the associated device; and
a pressure equalization membrane vent being provided with the enclosure body preventing pressure buildup and protecting against liquid ingress in the associated device; said pressure equalization membrane vent being received within an aperture defined within a housing recess of the enclosure body.

2. The luminary fitting as recited in claim 1 wherein said pressure equalization membrane vent allows any internal moisture that could build up internally in the luminary, gasketed enclosure, or wiring box an escape point.

3. The luminary fitting as recited in claim 1 wherein said enclosure body is a unitary member, and the associated device is a selected one of an associated lighting fixture, gasketed enclosure and wiring box.

4. The luminary fitting as recited in claim 1 wherein said enclosure body includes a formed unitary member.

5. The luminary fitting as recited in claim 1 wherein said enclosure body is an injection molded member.

6. The luminary fitting as recited in claim 1 wherein said enclosure body is a machined member.

7. The luminary fitting as recited in claim 1 wherein said enclosure body is formed of a selected corrosion resistant material.

8. The luminary fitting as recited in claim 1 wherein said enclosure body is formed of a selected material of a group including a sheet molding compound (SMC), an injection molded resin, an extrusion grade resin, an aluminum material, and a galvanized steel material.

9. The luminary fitting as recited in claim 1 wherein said sealing gasket is secured by an internal threaded nut mounted on the threaded wire way.

10. The luminary fitting as recited in claim 1 wherein said sealing gasket is formed of an elastomeric material, a rubber, a type of synthetic rubber, such as, EPDM rubber (ethylene propylene diene monomer rubber), neoprene, or silicon.

11. The luminary fitting as recited in claim 1 wherein said sealing gasket is formed of a selected one of a rubber, a synthetic rubber, neoprene, or silicon material.

12. The luminary fitting as recited in claim 1 wherein said sealing gasket is formed of EPDM rubber (ethylene propylene diene monomer rubber).

13. The luminary fitting as recited in claim 1 wherein said sealing gasket is secured by an internal threaded nut mounted on the threaded wire way for sealing and providing vibration isolation.

14. The luminary fitting as recited in claim 1 wherein said pressure equalization membrane vent includes a membrane formed of a selected one of a polymer material, a Gore-Tex fabric and a polytetrafluoroethylene (PTFE) material.

15. The luminary fitting as recited in claim 1 wherein said pressure equalization membrane vent provides a waterproof breathing opening venting excess pressure, preventing pressure buildup and protecting against liquid and dust ingress in the associated device.

16. The luminary fitting as recited in claim 1 wherein said pressure equalization membrane vent provides said waterproof breathing opening venting moisture condensed from ambient air inside the luminary, gasketed enclosure, or wiring box while protecting against liquid and dust ingress in the associated device.

17. The luminary fitting as recited in claim 1 wherein said enclosure body includes a selected physical size for a particular connection with the associated device.

18. The luminary fitting as recited in claim 1 wherein said pressure equalization membrane vent of the luminary fitting is configured with said enclosure body to prevent solid particle ingress and to provide an escape vent for excess moisture accumulation inside a luminary gasketed enclosure, or wiring box, while providing liquid ingress protection rating performance.

* * * * *